United States Patent [19]
Cantarano

[11] 3,931,627
[45] *Jan. 6, 1976

[54] ELECTROGRAPHIC DEVICES AND APPARATUS FOR NON-ELECTROSTATICALLY PRODUCING IMAGES FROM AN ORIGINAL PROVIDED WITH A CONDUCTIVITY PATTERN

[76] Inventor: Marcus Cantarano, No. 47 ave. F. Roosevelt, 94320 Thiais, France

[ * ] Notice: The portion of the term of this patent subsequent to June 17, 1992, has been disclaimed.

[22] Filed: Jan. 7, 1974

[21] Appl. No.: 431,960

Related U.S. Application Data

[60] Division of Ser. No. 151,488, June 9, 1971, Pat. No. 3,826,672, which is a continuation-in-part of Ser. No. 631,792, April 18, 1967, abandoned.

[52] U.S. Cl. .......................... 346/74 ES; 178/6.6 A
[51] Int. Cl.$^2$ .................. G03G 15/04; G01D 15/06
[58] Field of Search ....... 346/74 ES, 74 EW, 74 EE, 346/73 EL, 74 EH; 178/6.6 A

[56] References Cited

UNITED STATES PATENTS

| | | | |
|---|---|---|---|
| 2,901,374 | 8/1959 | Gundlach | 346/74 ES |
| 2,912,586 | 11/1959 | Gundlach | 346/74 ES |
| 3,182,591 | 5/1965 | Carlson | 346/74 EW |
| 3,194,674 | 7/1965 | Sakurai | 346/74 ES |
| 3,234,904 | 2/1966 | Wagner | 346/74 EW |
| 3,257,222 | 6/1966 | Carlson | 346/74 ES |
| 3,266,046 | 8/1966 | Boyd | 346/74 ES |

*Primary Examiner*—Bernard Konick
*Assistant Examiner*—Jay P. Lucas

[57] ABSTRACT

Electrographic devices and apparatus comprising an original provided with a conductivity pattern ranging from a portion having a greater conductivity to a portion having a lesser conductivity, means for placing a thin layer of electrically chargeable particles in electric contact with said conductivity pattern, and means for generating an electric field of sufficient strength across said layer of electrically chargeable particles and said conductivity pattern so as to transfer electric charges from said conductivity pattern to said electrically chargeable particles so that said particles receive electric charges having different maximum values according to the different conductivities of said portions of said conductivity pattern whereby a portion of said particles are sufficiently charged and removed from said layer of electrically chargeable particles and the remainder of said particles are insufficiently charged so that they continue to remain in said particles layer thereby producing a stable electrographic image.

23 Claims, 6 Drawing Figures

Figure 1:
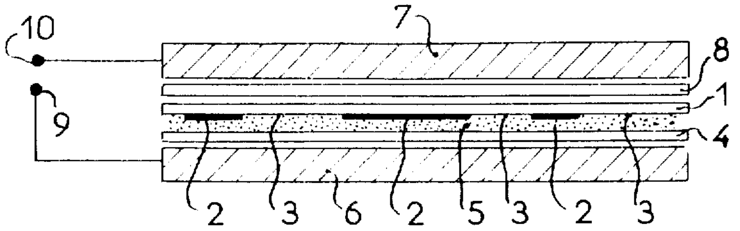

ELECTROGRAPHIC DEVICES AND APPARATUS FOR NON-ELECTROSTATICALLY PRODUCING IMAGES FROM AN ORIGINAL PROVIDED WITH A CONDUCTIVITY PATTERN

This application is a division of application Ser. No. 151,488, filed June 9, 1971, now U.S. Pat. No. 3,826,672 which application in turn is a continuation-in-part of application Ser. No. 631,792 filed Apr. 18, 1967 and now abandoned.

This invention relates to the production of electrographic images from an original provided with a conductivity pattern.

As used herein, the term "conductivity pattern" is to be understood as including any virtually plane surface formed by parts having different electric conductivities.

The term "insulating" is to be understood as defining the quality of having an electric conductivity lower than $10^{-11}$mho/cm and the term "non-insulating" as defining the quality of having an electric conductivity superior to $10^{-11}$mho/cm.

In the actual art, a feature of electrographic methods resides in the use of an original provided with a conductivity pattern including high insulating parts which will selectively hold electric charges to form a latent electrostatic image; thus an electrographic image may be developed by an electrically responsive powder which adheres to the charged parts of the latent image. This electrographic image will not be obtained in a stable way because of the passage of electric charges even through the high insulating parts of the original causing the effacement of at least a part of the latent image during the step of the development. A typical original of actual electrography consists in a photoconductive layer provided with a conductivity pattern resulting from an exposure to the optic image of a document to reproduce. Such a photoconductive layer will be a high insulator in the dark in order to obtain a conductivity pattern including the non-illuminate high insulating parts serving to develop an electrographic image according to existing methods. These photoconductive insulating layers are slow in their response to successive different exposures to the light and, consequently, they may not be used to afford high speed processes to produce successive different electrographic images. Now in accordance with the present invention, it has been found that a stable electrographic image may be formed and simultaneously developed from any original provided with a pattern of conductive and low conductive parts in the absence of a latent electrostatic image.

The present invention pertains to the production of electrographic images from a thin uniform layer of developer particles placed in electric contact with the conductivity pattern of an original. An electric field is generated across the layer of particles to electrically charge the particles from the conductivity pattern of the original. In the carrying out of the invention the different parts of the layer of particles receive from said pattern electric charges having different maximum values in accordance with the different conductivities of said conductivity pattern. Consequently, the most charged particles are electrically removed by the electric field while the remaining part of the particles never holds sufficient maximum charges to be removed and thus it develops a stable electrographic image.

According to one embodiment of the present invention, a stable electrographic image is produced by generating an alternating electric field charging a thin layer of developer particles from the conductivity pattern and thus applying to this particles layer electric charges having different maximum values according to the different conductivities of said pattern. Under the action of the electric field, the most charged particles are electrically attracted away from the layer of particles while the remaining particles layer is never sufficiently charged to be electrically removed. This remaining part of the particles layer develops a stable electrographic image in substantial configuration with the conductivity pattern of the original and the satisfactory quality of the obtained image is irrespective of the duration of its development. This method is well adapted to produce the dense large areas as well as the half-shadow areas of the electrographic image.

According to another embodiment of the invention, the thin layer of developer particles is placed against and interposed between the conductivity pattern of the original and an image carrier having an electric conductivity between the maximum and the minimum conductivities of said pattern, and an electric field is generated to charge the particles from said conductivity pattern and said image carrier. Because of the intermediate conductivity of the image carrier, under the influence of the electric field, the particles are electrically charged and attracted away from the most conductive parts of said pattern to form a first stable electrographic image on said image carrier while another part of the particles is electrically attracted toward the least conductive parts of said pattern to form a second stable electrographic image thereon. This method is well adapted to simultaneously produce two stable electrographic images from any kind of original provided with a pattern of conductive and low conductive parts.

According to a further embodiment of this invention, an original is used which is provided with a pattern of conductive and low conductive parts on to an insulating backing material, the conductivity pattern of the original is coated with a thin layer of developer particles, an insulating layer is placed against the layer of particles, and an electric field is generated to charge the particles from said conductivity pattern and thus to apply to the particles layer electric charges having values in proportion to the conductivities of said pattern. Under the influence of the electric field, the charged particles are electrically attracted away from the most conductive parts of said pattern while, because of the insulation of the coated conductivity pattern between the insulating backing and the insulating layer, the remaining part of the particles layer is never sufficiently charged to be removed and thus it develops a stable electrographic image on the least conductive parts of said pattern.

According to a further embobiment of this invention, a metallic image carrier is coated with a thin layer of developer particles, the conductivity pattern of an original is placed against the coating particles and a variable electric field is generated to charge the layer of particles from said conductivity pattern and said image carrier. By using an insulating electrostatically chargeable developer, the developer particles may be electrically attracted toward the most conductive parts of said pattern to form a first stable electrographic image thereon, while another part of the particles layer is attracted away from the least conductive parts of said pattern to form a second stable electrographic image on said image carrier. On the contrary, by using a non-insulating developer, a stable electrographic image facing the most conductive parts of said pattern is formed on said image carrier, while a second stable electrographic image is formed on the least conductive parts of said pattern. Furthermore, according to this embodiment of the invention, a sheet of copy material is placed against the electrographic image on said image carrier and an electric field is generated to charge the particles of the electrographic image from the conductive image carrier and thus to transfer the electrographic image from the metallic image carrier onto the copy material.

An object of this invention is to provide devices and apparatus for use in electrography.

Other objects of this invention will be apparent from the following description and accompanying drawing taken in connection with the appended claims.

Figure 2:
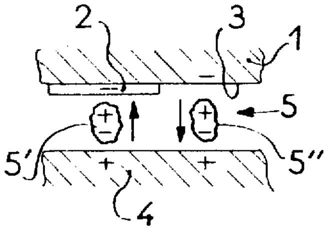
Figure 3:
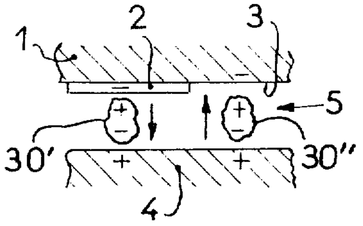
Figure 4:
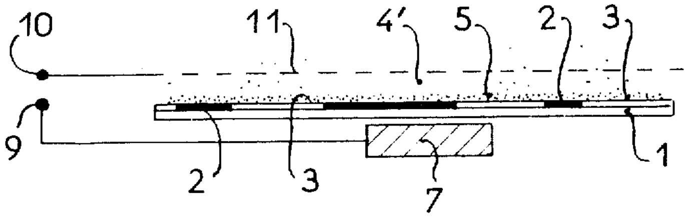
Figure 5:
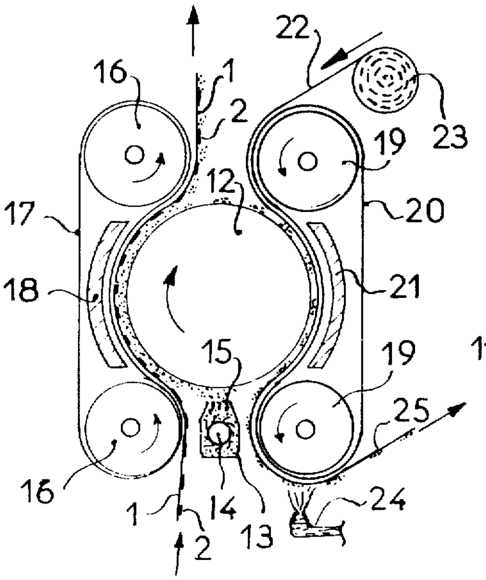
Figure 6:
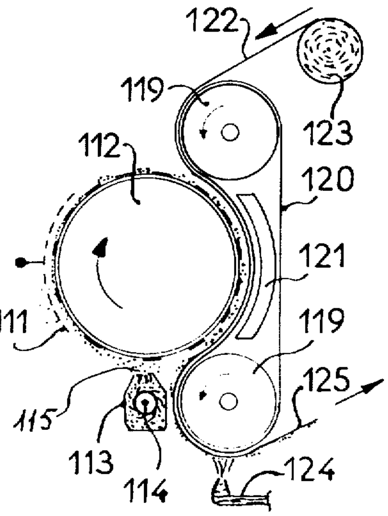

Several embodiments of the invention will now be described by way of example and with reference to the accompanying drawing, in which:

FIG. 1 is a sectional view showing an original and a sheet serving as an image carrier, arranged between two electrodes, FIG. 2 is a schematic representation of the electric charges between the original and the image carrier, FIG. 3 is another schematic representation of the electric charges between the original and the image carrier, FIG. 4 is a schematic representation of the arrangement of an original between a grid-shaped first electrode and a second electrode, FIG. 5 is a schematic representation of a device with a drum-shaped electrode, and FIG. 6 is a schematic representation of another embodiment of the device according to the invention.

In the arrangement shown in FIGS. 1 to 3, for producing an electrographic image an original provided with indicia 2 having another electric conductivity than the surface 3 of the backing material 1 is disposed between two electrodes 6 and 7. Owing to the differences of electric conductivity between the materials of the parts 1 and 2 of the original, the latter is provided with a conductivity pattern formed by areas 2 of the indicia and the blank surface 3 of the backing 1. Also arranged between the electrodes 6 and 7 is an image carrier 4 placed against a thin uniform layer of developer particles 5 facing the conductivity pattern 2, 3 of the original. Alternatively, the developer particles 5 may be applied to the conductivity pattern 2, 3 or to the image carrier 4. Such coating of the particles onto either the image carrier 4 or the original can be accomplished in the well known manner by the use of rotating brushes, or by spraying or by cascading the particles. A dielectric 8 may be disposed between the electrodes 6 and 7 to avoid a useless consumption of heating current passing through the device. In the arrangement shown in FIG. 1, the electrodes 6 and 7 are provided with terminals 9 and 10, respectively. The dielectric 8, which is disposed between the original and the electrode 7, may consist of a sheet of MYLAR of a thickness of about 150 microns, for example. Furthermore, a second similar dielectric sheet may be arranged between the image carrier 4 and the electrode 6. Indicia 2 may be of different types such as typewriting or pencil traces. On the other hand, if continuous tone electrographic images are to be produced, any original may be used which is provided with a conductivity pattern comprising differently conductive indicia 2 forming dense areas and half-shadow areas, as like as a photographic print.

Since it is not important as far as this invention is concerned just how the conductivity pattern of the original is formed, but instead it is important as regards this invention that the particles layer 5 is placed in electric contact with a conductivity pattern 2, 3 to reproduce.

An electric high voltage is applied to the terminals 9 and 10 to generate an electric field between the electrodes 6 and 7. For example, a direct voltage of 25 KV may be applied to the terminals for a period of a few milliseconds. However, it is advantageous to generate an alternating voltage, for example, of 50 cycles/sec and 5 KV. Instead of this, an attenuated or an alternatively modulated voltage may be applied to terminals 9 and 10. Under the action of the electric field, the particles 5 receive electric charges having different maximum values according to the different conductivities of the pattern 2, 3 and thus the grains of the particles layer 5, accordingly to the different maximum values for their charges, are differently attracted toward the original and toward the image carrier 4. When, subsequently, the electrodes 6 and 7 are separated and the image carrier 4 is detached from the original, a part of the layer of particles 5 will be found forming an electrographic image on the image carrier 4, and the remaining part of the particles layer forms another electrographic image on the original. According to the experience, the two electrographic images are obtained in substantial configuration with the indicia 2 and the blank surface 3 of the original.

In the carrying out of the invention an image carrier 4 is used which has an electric conductivity between the maximum and the minimum conductivities of the parts 2, 3 forming the conductivity pattern on the original. For example, a sheet of conductive paper having this intermediate uniform conductivity may be used as image carrier 4. Moreover, as disclosed in my copending application Ser. No. 870,404 now U.S. Pat. No. 3,721,551, the image carrier 4 may consist in a very thin metallic layer affixed on an insulating backing material; for example, there may be used a metallic layer of a uniform thickness from a fraction of a micron to a few microns of gold, silver, aluminum or tellurium evaporated under vacuum on a sheet of MYLAR. Such a very thin metallic layer will act on its insulating backing as like as an image carrier having said intermediate conductivity. On the other hand it will be appreciated that, by using an image carrier 4 affixed on the conductive electrode 6 and a conductivity pattern affixed on the electrode 7, said intermediate conductivity of the image carrier 4 will depend also on the thickness of the image carrier 4 and of the parts 2, 3 of the original.

Referring now to FIG. 2 which schematically shows two grains 5′ and 5″ of the particles layer 5, a part of the original provided with a conductive backing 1 and low conductive indicia 2, and a part of the image carrier 4 having said conductivity between the conductivities of the indicia 2 and of the backing 1 of the original. It will be appreciated however that the particles 5 are disposed in such a manner that numerous grains 5 will form the thickness of the layer 5. Depending on the relative conductivities of the parts 2, 3 and 4, the contact conductance between the grains 5″ and the blank surface 3 is higher than the contact conductance between the grains 5'' and the image carrier 4. The contact conductance between the grains 5' and the image carrier 4 is higher than the contact conductance between the grains 5' and the indicia 2. Under the influence of the electric field, each grain of the particles layer 5 is electrically charged under the sign of that surface to which the contact conductance is the more, and thus it will be electrically attracted away from this surface. For this reason, irrespectively of the direction of the electric field, the grains 5'' will electrically migrate from the conductive surface 3 toward the image carrier 4 and the grains 5' migrate from the image carrier 4 toward the low conductive indicia 2, as shown by the arrows in FIG. 2. The electrographic image thus formed by the particles 5' on the indicia 2 will be termed positive upright image, and negative reversed image is called the electrographic image formed on the image carrier 4 by the particles facing the blank surface 3 of the original. On the other hand, the FIG. 3 shows two grains 30' and 30'' of the particles layer 5 interposed between the image carrier 4 and an original having conductive indicia 2 and low conductive backing 1. Under the influence of the electric field and irrespectively of the direction of this field, the grains 30' will electrically migrate from the conductive indicia 2 toward the image carrier 4, and the particles 30'' migrate from the image carrier 4 toward the low conductive backing 1, as shown by the arrows in the FIG. 3. The electrographic image thus formed on the surface 3 will be termed negative upright image, and positive reversed image is called the electrographic image formed on the image carrier 4 by the particles facing the indicia 2 of the original.

From the foregoing explanations it becomes apparent that the formation of the electrographic images depends only on the relative conductivities of the parts 2, 3 and 4. Thus, in accordance with the proposal of the present invention, images of satisfactory quality will be obtained irrespectively of a critical conductivity of the pattern of the original and of a critical duration of the electric field serving to their development.

The best quality of the electrographic images is obtained by applying to the terminals 9 and 10 an alternating or an alternatively modulated electric field.

Under the action of the alternating field, the particles 5 facing the most conductive parts of the original will form the dense areas of the stable electrographic image on the image carrier 4, the particles 5 facing the intermediately conductive parts of the pattern 2, 3 will be distributed between the original and the image carrier 4 to form the half-shadow areas of both the electrographic images, and the remaining particles 5 will form the dense areas of the electrographic image on the least conductive parts of the original.

It may be stated in general that, under the action of the electric field charging the particles 5, conductive particles between the image carrier 4 and the conductivity pattern 2, 3 are more strongly attracted toward the least conductive parts of the pattern 2, 3 than toward its most conductive parts.

On the other hand, when an image carrier is used having a uniform conductivity lower than the minimum conductivity of the pattern 2, 3 of the original, under the influence of the electric field the particles 5 will be more strongly attracted by the image carrier 4 than by the original. Moreover, if an image carrier 4 is used having a uniform conductivity higher than the maximum conductivity of the pattern 2, 3, under the influence of the electric field the particles 5 will be more strongly attracted by the original than by the image carrier 4. Because of this effect, if an insulating image carrier 4 is used, the particles 5 will be applied loosely-adhering to the original before the application of the electric field. On the contrary, if a metallic image carrier 4 is used, the particles 5 will be applied loosely adhering to the image carrier 4. This adherence of the particles 5 may be obtained by gravity as well as by coating the image carrier 4 or alternatively the conductivity pattern of the original with a thin slightly adhesive substance, as for example zinc or aluminum stearate. Moreover, any other means having similar adherent qualities as those mentioned above for holding the particles layer 5 may be used.

According to another embodiment of the present invention, an image carrier is used which has a uniform electric conductivity higher than the maximum conductivity of the pattern 2, 3 of the original. Referring to this embodiment, the FIGS. 1, 2 and 3 show the thin conductive image carrier 4 which may consist, for example, in a metallic sheet of steel or aluminum. Alternatively, a thin layer of non-insulating or high insulating electrostatically chargeable particles 5 may be used. The layer of particles 5 is interposed between a high conductive image carrier 4 and an original provided with a pattern of conductive indicia 2 on a low conductive backing 1. By applying a voltage to the terminals 9 and 10 in connection with the use of insulating developer particles 5, these particles electrically migrate according to the directions shown by the arrows is FIG. 2; hence a positive upright image is formed on the original and a negative image on the image carrier 4. By using non-insulating particles 5, these particles will be applied loosely adhering to the high conductive image carrier 4 before the application of the electric field forming electrographic image. Under the influence of the electric field, as it is shown by the arrows in FIG. 3; the non-insulating particles 5 will form a positive reversed image on the image carrier 4 and a negative upright image on the original.

On the other hand, by using an original provided with low conductive indicia 2 on a conductive backing 1 in the device of FIG. 1, a conductive developer 5 will form a negative reversed image on the image carrier 4 and a positive upright image on the original, and an insulating developer 5 will form a negative upright image on the original and a positive reversed image on the image carrier. However, the electrographic images may be developed by generating an alternating or an alternatively modulated electric field of sufficient strength to apply alternating charges to the particles so that a part of the particles layer 5 is electrically removed from the conductive parts of the original to form a stable electrographic image on the image carrier 4 and the remainder of the particles layer forms a second stable electrographic image on the low conductive parts of the original.

In the arrangement shown in FIG. 4, a particles-coated original provided with a pattern of conductive indicia 2 and low conductive parts 3 is disposed under an electrode in the form of a grid 11. The thin layer of developer particles 5 is insulated from the grid 11 by a fluid dielectric 4'. The grid 11 may be made of brass and have a mesh width of 0.5 mm, for example. The particles 5 are applied loosely-adhering to the conductivity pattern 2, 3. In accordance with the experience, the particles will better adhere to the original by providing an electrode 7 in the form of wires onto which strongly converge the lines of force of the electric field generated between the electrodes 7 and 11. Under the influence of this field the particles are electrically charged and removed from the conductive indicia 2, while the particles coating the low conductive parts 3 are never sufficiently charged to electrically overcome their adherence to the parts 3 and thus they develop a stable electrographic image thereon. The space between the electrode 11 and the particles 5 must be sufficiently thick so that the intensity of the electric field not exceeds 3 V/micron in the layer of air 4' to avoid an electric discharge between the electrode 11 and the particles 5. Instead of the air 4', any other insulating gas as well as an insulating liquid may be used as fluid dielectric 4'. What matters is that the particles layer 5 is insulated from the electrode 11 and that the layer 4' permits the passage of the particles 5 attracted away from the original during the development; these particles thus migrate through the openings of the grid 11 and they are definitively removed from the electric field. Furthermore, in accordance with the present invention, when a direct field is generated between the electrodes 7 and 11, the conductivity pattern 2, 3 will be electrically insulated from the electrode 7 to prevent any direct electric current filterring through the low conductive parts 3 from electrically charging and removing even the part of the particles layer which coats the parts 3 and which serves to develop the stable image. Such insulation of the pattern 2, 3 is generally constituted by the insulating backing 1 of the original. If, one the contrary, the backing 1 is made of a low insulating material, a dielectric has to be arranged between the latter and the electrode 7.

In the device of FIG. 4, an alternating voltage may be applied to the terminals 9 and 10. The particles 5 thus receive from the pattern 2, 3 alternating electric charges having different maximum values in proportion to the conductivities of said pattern and the most charged particles are electrically attracted through the grid electrode 11. Under the influence of the alternating voltage the particles are electrically removed from the conductive indicia 2 while the particles coating the low conductive parts 3 are never sufficiently charged to overcome their adherence to the parts 3 and thus they form a stable electrographic image thereon.

In addition, in the device of FIG. 4, an original may be used which is provided with a pattern 2, 3 affixed to an insulating backing 1. By applying an alternating or an alternatively modulated electric field, the coating particles 5 receive from the pattern 2, 3 alternating electric charges having maximum values in proportion to the conductivities of said pattern 2, 3; under the influence of the alternatively modulated voltage the particles are electrically attracted from the conductive indicia 2 while the remaining part of the particles develops a stable electrographic image on the low conductive parts 3.

On the other hand the original, the electrode 7 and electrode 11 may be disposed parallel to a vertical plane, such a vertical arrangement of parts is shown in the left-hand part of FIG. 6, in which figure the grid 11 corresponds to the grid electrode 11 of FIG. 4.

The device of FIG. 4 can also be used to produce two stable electrographic images simultaneously from the same original by placing against the layer of particles 5 an insulating paper of copy intercepting the particles electrically removed from the indicia 2 during the application of the electric field. Such a disposition of parts is shown in FIG. 1, the insulating paper of copy constituting the image carrier 4 placed against the layer of particles 5.

In carrying out this invention a developer powder of charcoal has been found useful to form the particles layer 5. Alternatively, other developer powders, such as metallic or thermoplastic powders may be used as well as liquid or plastic developers. When a developer powder is used, its grains can be advantageously coated with stearic acid or zinc or aluminium stearate; such a treatment will render the powder somewhat adhesive and give to its grains a very thin insulating coat which prevents electric discharges between contiguous particles of the layer 5 during the application of the electric field. Furthermore, after the charging of conductive particles in the device of FIG. 1, these particels 5 will conserve intense residual charges because of their insulating coats and thus they may be attracted by said attenuated electric field to form electrographic images. These residual charges of the particles serve also to maintain the obtained particles images on the original and on the image carrier 4, after the application of the electric field.

Other high insulating thermoplastic developers may be used. If required, these plastic materials may be rendered conductive by mixing them with pure carbone, as well known in the art.

For carrying out the invention as described with reference to FIGS. 1 to 3 an apparatus of the type illustrated in FIG. 5 may be used. This apparatus serves to reproduce originals of any kind on any type of paper. The apparatus comprises a preferably metallic rotatable drum 12 taking over the task and the function of the electrode and the image carrier 4 of the FIG. 1 embodiment. A spraying device 13 including a rotatable brush 14 is arranged for spraying the developer powder through a grid 15 to uniformly coat the surface of the rotating drum 12. Thereby a potential difference may be produced between the spraying device 13 and the rotatable drum 12. In operation, the original 1, 2 is continuously driven by an endless belt 17 guided over two cylindrical rollers 16 and placing the original 1, 2 against the powder layer on the rotating drum 12. The endless belt 17 is made of a dielectric material. Arranged between the two rollers 16 and adjacent to the endless belt 17 is an arcuate electrode 18 taking over the function of the electrode 7 of FIG. 1. The original 1, 2 will travel upwardly out the apparatus, as shown in FIG. 5.

The voltage applied to the rotatable drum 12 and the electrode 18 is so chosen as to realize the conditions heretofore described with reference to FIGS. 1 to 3. A conductive powder 5 will be attracted by the parts of the pattern 2, 3 having the lesser conductivity and then brushed off, whereas in the areas that correspond to the parts of the pattern 2, 3 having the greater conductivity the rotating drum 12 will carry along the powder and thus represent a reversed image.

As shown in the right-hand of FIG. 5, the apparatus comprises a second pair of rollers 19 guiding an endless belt 20 of dielectric material which is similar to the endless belt 17. The belt 20 is likewise adapted to be placed towards the drum 12 by an arcuate electrode 21. The two rollers 19, moreover, serve to guide a sheet of paper 22 which is unwound from a supply roller 23. The transfer of grains of powder 5 that have remained on the surface of the rotating drum 12 to the sheet of paper 22 is effected while the latter is continuously placed against the rotating drum 12 so that an upright image is produced on the sheet of paper 22. At the outlet of the apparatus this upright image will be fixed by an atomizer 24 adapted to spray an appropriate solvent on the sheet of paper 22. A replica of the original 1, 2 will then be obtained at 25 after the drying of the sheet of paper 22.

A drum 12 may be used which has a high electric conductivity on its surface coated with a non-insulating developer powder, the drum 12 then taking over the task and the function of the metallic image carrier 4 of FIG. 1 embodiment. Because of the high conductivity of the drum 12, the apparatus of FIG. 5 is well adapted to the satisfactory transfer of electrographic images on to slight conductive sheets or webs of copy material 22, which is usually difficult to obtain in electrography. Thus, according to the invention, replicas of good quality may be produced on sheets or webs of ordinary commercial paper, which paper is generally a low insulating material of copy.

For carrying out the invention as described with reference to FIG. 4, an apparatus of the type illustrated in FIG. 6 may be used. In this case, for simplifying the operation an inverted original may be used. The original is secured to the periphery of a rotatable drum 112. Sismilarly as the FIG. 5 embodiment, a spraying device 113 is arranged for uniformly distributing the powder on the surface of the rotatable drum 112. When the drum 112 is rotating the powder-coated original passes below a grid 111 which is equivalent to the grid of FIG. 4. When a voltage is applied between the grid 111 and the rotatable drum 112, the conditions described with reference to FIG. 4 are obtained.

The arrangement in the right-hand part of FIG. 6 is equivalent to the arrangement in the right-hand part of FIG. 5, those parts in FIG. 6 which correspond to equivalent parts in FIG. 5 being identified by the same numerals as in FIG. 5 plus 100. This arrangement is adapted to effect the transfer and the reversal of the image as well as the fixing thereof in a manner similar to that described with reference to FIG. 5. If, as hereinbefore mentioned, a reversed image of the original is used for the reproduction, an upright image will be obtained on every revolution of the drum 112. This method can be adapted successfully for the high speed production of a large number of printed matters by using an original provided with a pattern having high differences in conductivity.

Another possibility of application of the apparatus shown in FIG. 5 consists in that the original is secured to the rotatable drum 12. A second spraying device is arranged on the upstream side of the two rollers 19 so taht two replicas will be obtained on each revolution of the drum. One of the two replicas is produced on the web of copy paper of the roller 19 and the other one is produced between the rollers 16 which are likewise associated with an identical copy paper supply roller 23 and a second atomizer 24. By this embodiment of the apparatus of FIG. 5, each electrographic image is formed and simultaneously transferred on a web of copy paper which takes over the task and the function of the image carrier 4 hereinbefore mentioned with reference to FIGS. 1 and 4.

The apparatus may be constructed also in such a manner that when an original is continuously advanced and simultaneously coated with a powder or a liquid, the original coated with the powder or the liquid, respectively, travels on a plane surface instead of on the cylindrical surface of the drum 12, 112. In this manner it is avoided that parts of the powder or of the liquid, respectively, are centrifugated off.

While the method herein described, and devices and apparatus used for carrying out the invention into effect constitute preferred embodiments, it is to be understood that the invention is not limited to the precise method, devices and apparatus herein described, and that changes may be made without departing from the scope of the invention which is defined in the appended claims. More specifically and by way of example, it is to be understood that the devices shown in FIGS. 1 and 5 may also be used for producing either a positive or a negative electrographic image on the image carrier 4; to this end a layer of insulating particles capable of receive an electric charge is sandwiched between the image carrier 4 and the conductivity pattern 2, 3 of the original, a first high voltage of sufficient value is applied to the terminals 9 and 10 so as to transfer electric charges from the conductivity pattern 2, 3 to the layer of electrically chargeable particles 5, these particles thereby receiving a pattern of electric charges in substantial configuration with the pattern 2, 3, thereafter an attenuated electric field is generated of insufficient strength so as to change the charges of the particles whereby the charged particles will be attracted by said attenuated field to form a positive electrographic image either on the image carrier 4 or on the original depending on the direction of the attenuated electric field. Alternatively, an insulating developer or a conductive developer powder with insulating coats as those above described may be used in the carrying out of this method.

In addition, the devices of FIGS. 4 and 6 may be used to form an electrographic image on the conductive indicia 2 of the original. To this end, an original is used which is provided with high conductive indicia 2 as, for example, an original provided with indicia having a thickness of about 10 microns and an electric conductivity from $10^{-2}$ to $10^{-7}$ mho/cm. By generating an electric field having between the pattern 2, 3 and the electrode 11 an intensity from 2.4 to 3.0 V/micron, the particles 5 are electrically charged and removed from the low conductive parts 3 and the remainder of the particles form an electrographic image on the conductive indicia 2. In the carrying out of this method a silent ionizing discharge occurs between the coating particles 5 and the electrode 11, this discharge being more intense in proximity of the high conductive parts 2 than in proximity of the low conductivity parts 3 of the original, whereby the particles on the conductive parts 2 receive ionizing charges having the same sign as that of the electrode 11 resulting a very low intensity of the electric field between the indicia 2 and the electrode 11, this electric field having an intensity insufficient to remove the particles away from the parts 2 thereby forming an electrographic image on these parts 2 by the removal of the particles charged from the low conductive parts 3. The electric conductivity of the parts 3 of the original is not critical although these parts 3 may be formed from a material having an electric conductivity from $10^{-13}$ to $10^{-9}$ mho/cm.

What I claim is:

1. A device for producing electrographic images from an original provided with a conductivity pattern ranging from a portion having a greater conductivity to a portion having a lesser conductivity, said device comprising means for placing a thin layer of electrically chargeable particles in contact with said conductivity pattern, means for generating an alternating electric field of sufficient strength across said layer of electrically chargeable particles and said conductivity pattern so as to transfer electric charges from said conductivity pattern to said electrically chargeable particles whereby said particles receive electric charges having different maximum values according to the different conductivities of said portions of said conductivity pattern whereby a portion of said particles are sufficiently charged and removed from said layer of electrically chargeable particles and the remainder of said particles are insufficiently charged so that they continue to remain in said particles layer thereby producing a stable electrographic image.

2. A device as defined in claim 1 further including an insulating backing placed against said conductivity pattern so that said conductivity pattern contacting said electrically chargeable particles is located between said insulating backing and said layer of electrically chargeable particles.

3. A device as defined in claim 1 further including an insulating layer placed against said conductivity pattern so that said layer of electrically chargeable particles contacting said conductivity pattern is located between said insulating layer and said conductivity pattern.

4. A device as defined in claim 1 further including a first and a second insulating layer between which said conductivity pattern contacting said electrically chargeable particles and said layer of electrically chargeable particles are located.

5. A device as defined in claim 1 further including an insulating image carrier placed against said conductivity pattern so that said layer of electrically chargeable particles contacting said conductivity pattern is located between said insulating image carrier and said conductivity pattern.

6. A device as defined in claim 1 wherein said generating means includes a grid- shaped electrode placed in spaced relationship with said conductivity pattern so that said layer of electrically chargeable particles is located between said conductivity pattern and said grid-shaped electrode.

7. A device as defined in claim 1 further including a conductive image carrier placed against said conductivity pattern so that said layer of electrically chargeable particles contacting said conductivity pattern is located between said conductive image carrier and said conductivity pattern.

8. A device as defined in claim 7 further including a first and a second insulating layer between which said conductive image carrier, said particles layer contacting said conductivity pattern and said conductivity pattern are located.

9. A device for producing electrographic images from an original provided with a conductivity pattern ranging from a portion having a greater conductivity to a portion having a lesser conductivity, said device comprising an insulating backing material onto which said conductivity pattern is affixed, means for coating said conductivity pattern with a thin layer of electrically chargeable particles, an insulating image carrier placed against said conductivity pattern so that said layer of electrically chargeable particles is located between said insulating image carrier and said conductivity pattern and so that said conductivity pattern is located between said layer of electrically chargeable particles and said insulating backing material, means for generating an electric field of sufficient strength across said insulating backing material, said conductivity pattern contacting said layer of electrically chargeable particles and said insulating image carrier so as to transfer electric charges from said conductivity pattern to said electrically chargeable particles whereby said particles receive electric charges having different maximum values according to the different conductivities of said portions of said conductivity pattern whereby a portion of said particles are sufficiently charged and removed from said conductivity pattern and the remainder of said particles are insufficiently charged so that they continue to remain on said conductivity pattern thereby producing thereon a first stable electrographic image and a second stable electrographic image is formed on said insulating image carrier from said particles removed from said conductivity pattern.

10. A device as defined in claim 9 wherein said generating means includes means for changing the direction of said electric field.

11. A device for producing electrographic images from an original provided with a conductivity pattern ranging from a portion having a greater conductivity to a portion having a lesser conductivity, said device comprising an insulating backing material onto which said conductivity pattern is affixed, means for coating said conductivity pattern with a thin layer of electrically chargeable particles, an insulating layer placed against said conductivity pattern so that said layer of electrically chargeable particles is located between said insulating layer and said conductivity pattern and so that said conductivity pattern is located between said layer of electrically chargeable particles and said insulating backing material, means for generating an electric field of sufficient strength across said insulating backing material, said conductivity pattern contacting said layer of electrically chargeable particles and said insulating layer so as to transfer electric charges from said conductivity pattern to said electrically chargeable particles whereby said particles receive electric charges having different maximum values according to the different conductivities of said portions of said conductivity pattern whereby a portion of said particles are sufficiently charged and removed from said conductivity pattern and the remainder of said particles are insufficiently charged so that they continue to remain on said conductivity pattern thereby producing thereon a stable electrographic image.

12. A device as defined in claim 11 wherein said generating means includes means for changing the direction of said electric field.

13. A device for producing electrographic images from an original provided with a conductivity pattern ranging from a portion having a greater conductivity to a portion having a lesser conductivity, said device comprising an insulating backing material onto which said conductivity pattern is affixed, means for coating said conductivity pattern with a thin layer of electrically chargeable particles, a grid-shaped first electrode and a second electrode between which said conductivity pattern and said insulating backing material are interposed so that said insulating backing material is located between said conductivity pattern and said second electrode, means for maintaining said grid-shaped first electrode in a spaced relationship with said coated conductivity pattern, means for generating an electric field between said grid-shaped first electrode and said second electrode of sufficient strength so as to transfer electric charges from said connductivity pattern to said electrically chargeable particles whereby said particles receive electric charges having different maximum values according to the different conductivities of said portions of said conductivity pattern whereby a portion of said particles are sufficiently charged and removed from said conductivity pattern and through said grid shaped electrode and the remainder of said particles are insufficiently charged so that they continue to remain on said conductivity pattern thereby producing thereon a stable electrographic image.

14. A device as defined in claim 13 wherein said generating means includes means for alternatively modulating said electric field.

15. A device for producing electrographic images from an original provided with a conductivity pattern ranging from a portion having a greater conductivity to a portion having a lesser conductivity, said device comprising an image carrier having a uniform conductivity intermediate said greater conductivity and said lesser conductivity of said conductivity pattern, means for placing a thin layer of electrically chargeable particles in contact with said conductivity pattern and said image carrier so that said layer of electrically chargeable particles is sandwiched between said image carrier and said conductivity pattern, means for generating an electric field of sufficient strength across the sandwich formed by said image carrier, said layer of electrically chargeable particles and said conductivity pattern so as to transfer electric charges from said conductive image carrier to said layer of electrically chargeable particles and opposite electric charges from said conductivity pattern to said layer of electrically chargeable particles whereby a portion of said particles is electrically attracted toward said conductive image carrier to develop thereon a first stable electrographic image and the remainder of said particles is electrically attracted toward said conductivity pattern to develop thereon a second stable electrographic image.

16. A device as defined in claim 15 wherein said generating means includes means for changing the direction of said electric field.

17. A device as defined in claim 15 wherein said generating means includes means for alternatively modulating said electric field.

18. A device as defined in claim 15 further including an insulating backing material placed against said conductivity pattern so that said conductivity pattern is located between said insulating backing material and said layer of electrically chargeable particles contacting said conductivity pattern.

19. A device as defined in claim 15 further including an insulating layer placed against said conductivity pattern so that said layer of electrically chargeable particles contacting said conductivity pattern is located between said conductivity pattern and said insulating layer.

20. An apparatus for producing electrographic images on a copy material from an original provided with a conductivity pattern ranging from a portion having a greater conductivity to a portion having a lesser conductivity, said device comprising a conductive image carrier, means for coating said conductive image carrier with a thin layer of electrically chargeable particles, means for placing said conductivity pattern in contact with said layer of electrically chargeable particles so that said layer of electrically chargeable particles is sandwiched between said conductive image carrier and said conductivity pattern, means for generating a first electric field of sufficient strength across the sandwich formed by said conductive image carrier, said layer of electrically chargeable particles and said conductivity pattern so as to transfer electric charges from said conductivity pattern and from said conductive image carrier to said electrically chargeable particles whereby a portion of said electrically charged particles are removed and an electrographic image is formed on said conductive image carrier from the remainder of said particles, means for transporting said electrographic image bearing conductive image carrier to a transfer station, said transfer station comprising means for placing a copy material against the electrically chargeable particles of said electrographic image, and means for generating a second electric field of sufficient strength across said copy material and said conductive image carrier so as to electrically transfer the particles of said electrographic image onto said copy material.

21. An apparatus as defined in claim 20 wherein the generating means of said first electric field includes means for changing the direction of said first electric field.

22. An apparatus as defined in claim 20 wherein the generating means of said first electric field includes means for alternatively modulating said first electric field.

23. An apparatus as defined in claim 20 further including a first and a second insulating layer between which the sandwich formed by said conductive image carrier and said conductivity pattern contacting said electrically chargeable particles is interposed in said first electric field.

* * * * *